UNITED STATES PATENT OFFICE.

HANS T. CLARKE, OF ROCHESTER, NEW YORK, ASSIGNOR TO EASTMAN KODAK COMPANY, OF ROCHESTER, NEW YORK, A CORPORATION OF NEW YORK.

CELLULOSE-ETHER COMPOSITION AND METHOD OF MAKING THE SAME.

1,357,614.  Specification of Letters Patent.  Patented Nov. 2, 1920.

No Drawing.   Application filed March 17, 1919.   Serial No. 283,230.

*To all whom it may concern:*

Be it known that I, HANS T. CLARKE, a subject of the King of Great Britain, residing at Rochester, in the county of Monroe and State of New York, have invented certain new and useful Improvements in Cellulose-Ether Compositions and Methods of Making the Same, of which the following is a full, clear, and exact specification.

This invention relates to compositions of matter in which cellulose ethers are combined or mixed with other substances so that the resulting product can be advantageously used in the plastic and analogous arts, such, for instance, as sheet or film manufacture and varnish manufacture. One object is to produce a composition which may be made into permanently transparent, strong and flexible sheets or film of desired thinness that are substantially waterproof, are unaffected by ordinary photographic fluids and possess the desired properties of a support for sensitive photographic coatings. Another object of my invention is to produce a composition of matter capable of easy manipulation in the plastic and film making or varnish making arts; which will not injure or be injured by the substances with which it is associated during manufacture, storage or use. Still another object of my invention is to provide a process for compounding such composition of matter. Yet another object is to produce a composition having flame resisting properties or relative non-inflammability. Further objects will hereinafter appear.

I have discovered that a composition of matter having the desirable qualities hereinabove enumerated, can be obtained by mixing or compounding cellulose ether of the type described in United States Patent No. 1,188,376, granted June 20, 1916 to Leon Lilienfeld, with sulfones. The compounding is best performed by using a solvent common to cellulose ether and the particular sulfone employed. The sulfones which I have found to be most advantageous are of the type indicated by the following formulæ in which A and B represent various alkyl and sometimes aryl groups:

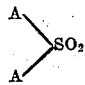 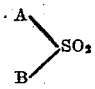

There are noted, for example, normal dibutyl sulfone, diisobutyl sulfone, dimethyl sulfone, diethyl sulfone, normal dipropyl sulfone, diisopropyl sulfone, diisoamyl sulfone, methyl ethyl sulfone, diheptyl sulfone, ethyl isoamyl sulfone, and diphenyl sulfone. These may be used in conjunction as well as used singly, and the degree of purity necessary in these substances will depend upon the purposes to which the composition is to be put. While these substances differ as regards boiling point, volatility, and solubility in water, they are all useful in varying ways in different branches of the plastic arts in connection with cellulose ether. These sulfones all have high boiling points and are very stable. The latter property is particularly essential in the photographic art where the liberation of break-down sulfur products might impair the light-sensitive coating. Other properties appear in various degrees in their homologues and derivatives.

For flexible film and varnish manufacture, the sulfone should be so nearly non-volatile that its loss during the desired life of film will not be sufficient to make the latter unserviceable. They are relatively flame resisting or slow burning compounds and when mixed with cellulose ether, which is itself almost incombustible, they impart the flame resisting quality to the product in a very useful degree.

As a typical useful example of the sulfones which may be employed in exercising my invention, the normal dibutyl sulfone is selected. It is a white solid at ordinary temperatures and its boiling point is above 250° C., so that its volatility when compounded with cellulose ether is practically *nil*. It is substantially insoluble in water and very stable. In carrying out one illustration of my invention, I incorporate in 15 to 30 parts of a chloroform, alcohol mixture, 3 to 6 parts (say, for instance, 5 parts) of cellulose ether, ½ to 10 parts of dibutyl sulfone. The chloroform and alcohol may be in various proportions, a three to one mixture being satisfactory. Instead of chloroform and alcohol being used as the common solvent, I may employ benzol and alcohol mixed, for example, in equal proportions. The ingredients are mixed to form a homogeneous solution or flowable mass and are filtered if desired. The alcohol may be the ordinary ethyl variety.

The solution is sufficiently thick and viscous to be properly flowed during sheet or film manufacture, the volatile solvents volatilizing but not too rapidly to impair the product. The resulting film containing the cellulose ether and sulfone is very flexible, transparent, and uniform, so that it can be used for any usual or preferred purpose. It is practically waterproof and unaffected by ordinary photographic chemicals. The sulfones are so stable that they do not in any appreciable degree eliminate products which injure metal or other parts with which they come in contact during manufacture; and moreover do not chemically react with or injure the other bodies that are associated with them in the solution or the completed film. While I have hereinabove disclosed certain compositions and processes by way of example, my invention is not limited thereto nor to the proportions given therein, as the proportions may be varied from those given and equivalent substances may be substituted without departing from the principle of my invention as defined in the appended claims.

Having thus described my invention, what I claim as new and desire to secure by Letters Patent is:

1. A transparent composition of matter comprising a cellulose ether and a sulfone.

2. A composition of matter comprising a cellulose ether and a simple dialkyl sulfone.

3. A composition of matter comprising a cellulose ether and a dibutyl sulfone.

4. A composition of matter comprising a cellulose ether, a simple dialkyl sulfone, and a solvent common to both.

5. A composition of matter comprising a cellulose ether, a dibutyl sulfone, and a solvent common to both.

6. A flowable film-forming composition of matter comprising a cellulose ether, a sulfone, and a solvent containing chloroform and alcohol.

7. A composition of matter comprising a cellulose ether, a dibutyl sulfone, and a solvent containing chloroform and alcohol.

8. A composition of matter comprising a cellulose ether 3 to 6 parts, dibutyl sulfone $\frac{1}{2}$ to 10 parts, and a chloroform alcohol mixture 15 to 30 parts.

9. As an article of manufacture, a sheet of a deposited or flowed cellulose ether containing a simple dialkyl sulfone.

10. As an article of manufacture, a sheet of a deposited or flowed cellulose ether containing a dibutyl sulfone.

11. The process of making a composition of matter which consists in combining a cellulose ether and a sulfone in a solvent common to both.

12. The process of making a composition of matter which consists in combining a cellulose ether and a dibutyl sulfone by the use of a solvent containing chloroform and alcohol.

13. A tough, flexible, transparent flowed sheet comprising cellulose ether and a sulfone.

Signed at Rochester, New York, this 15th day of March, 1919.

HANS T. CLARKE.